(12) United States Patent
Ehlert et al.

(10) Patent No.: US 7,231,756 B2
(45) Date of Patent: Jun. 19, 2007

(54) DEVICE FOR MOWING PLANTS

(75) Inventors: Detlef Ehlert, Satzkorn (DE); Siegwart Kraatz, Postdam (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 0 days.

(21) Appl. No.: 10/515,015

(22) PCT Filed: May 27, 2003

(86) PCT No.: PCT/EP03/05588

§ 371 (c)(1),
(2), (4) Date: Sep. 8, 2005

(87) PCT Pub. No.: WO03/098994

PCT Pub. Date: Dec. 4, 2003

(65) Prior Publication Data
US 2006/0123762 A1 Jun. 15, 2006

(30) Foreign Application Priority Data
May 27, 2002 (DE) ................. 102 24 151

(51) Int. Cl.
*A01D 34/83* (2006.01)
(52) U.S. Cl. ....................................... 56/244
(58) Field of Classification Search ............... 56/244, 56/245, 290, 291, 292, 14.5
See application file for complete search history.

(56) References Cited

U.S. PATENT DOCUMENTS

| | | | |
|---|---|---|---|
| 2,079,945 A | 5/1937 | Manning | 56/244 |
| 2,728,181 A | 12/1955 | Carpenter | 56/25 |
| 2,782,582 A | 2/1957 | McClearen et al. | 56/25 |
| 3,029,584 A * | 4/1962 | Johnson | 56/291 |
| 3,425,196 A | 2/1969 | Reed | 56/25 |
| 3,656,285 A | 4/1972 | Carlson | 56/244 |
| 3,682,012 A * | 8/1972 | Blankenship | 474/265 |
| 3,720,049 A * | 3/1973 | Tupper | 56/291 |
| 3,722,195 A * | 3/1973 | Hurlburt | 56/245 |
| 4,070,810 A | 1/1978 | Brakke | 56/290 |
| 5,644,904 A | 7/1997 | Olinger | 56/291 |
| 5,875,624 A | 3/1999 | Olinger | 56/244 |

FOREIGN PATENT DOCUMENTS

| | | |
|---|---|---|
| DE | 904 121 | 5/1953 |
| DE | 920 458 | 2/1954 |
| DE | 1 657 043 | 1/1971 |
| DE | 27 07 030 | 8/1978 |
| DE | 29 29 184 | 2/1981 |
| DE | 34 27 900 | 1/1986 |
| DE | 36 23 563 | 1/1988 |
| DE | 42 31 665 | 3/1994 |
| FR | 2 309 126 | 11/1976 |

\* cited by examiner

*Primary Examiner*—Árpád Fábián Kovács
(74) *Attorney, Agent, or Firm*—Gudrun E. Huckett

(57) ABSTRACT

A device for mowing plants has a frame, deflection rollers connected to the frame, and a circulating endless cutting belt provided with cutting teeth and guided about the cutting belt. A lower guide rail is connected to the frame for guiding the cutting belt. Guide brackets are connected to the lower guide rail for securing the cutting belt on the lower guide rail. Holding-down elements are connected to the lower guide rail, wherein the guide brackets have a stop edge and wherein the holding-down elements prevent the cutting belt from lifting off the lower guide rail.

16 Claims, 4 Drawing Sheets

DEVICE FOR MOWING PLANTS

BACKGROUND OF THE INVENTION

The invention relates to device for mowing plants that can be used, for example, in agriculture for mowing blade fodder and cereals.

For mowing fodder plants and cereals on agriculturally used areas, finger bar mowing devices and double blade mowing devices are used whose blades carry out an oscillating movement. Finger bar mowing devices have blade bars that move on a sine curve and have blades that force the material to be mowed against stationary mowing fingers provided with a counter edge so as to cut according to the principle of a scissor cut.

In the case of double blade mowing devices, a second blade bar moving in opposite direction provides the required counter edge.

Because of the sine-shaped movements, these mowing devices do not operate at a constant cutting speed but within a speed range of zero up to a limited maximum speed. The latter is limited to a few meters per second as a result of the occurring mass forces.

In principle, it is to be assumed that the oscillating mowing devices enable only a limited traveling speed and efficiency per unit area. In particular, finger bar mowing devices have the tendency to clog in the case of lush and herbaceous plants as well as to deliver unsatisfactory cutting qualities in the case of blade wear.

A second group of mowing devices are the rotary mowers which are configured either as drum mowing devices or as disk mowing devices. They have developed into the dominant technology in mowing under the conditions of modern European agricultural operations. In the case of drum mowing devices, the drive elements are arranged in a portal arrangement above the cutting plane while in the case of disk mowing devices the drive elements are arranged underneath the cutting plane. The drum mowing devices as well as the disk mowing devices operate according to the free cut principle, i.e., without a counter blade. In order to ensure free cutting as a result of inertia of the plants to be cut, these mowing devices generally are operated at a cutting speed above 70 m/s. Accordingly, rotary mowers require a very high drive power. Because of the resulting kinetic energy of the rotating parts, particularly the mowing blades and solid bodies (for example, rocks) accelerated by them, represent a significant risk of injury. The mowing blades have a material thickness of 3–4 mm. As a result of wear that occurs because of the cutting principle, the cutting edges will become round and therefore carry out more of a tearing than a cutting action. This leads to microscopically torn cutting surfaces on the individual stems and accordingly to growth depression in the following growing phase. Because of the translatory traveling movement and the circular blade movement, the rotor mowers carry out a cut only in the leading area so that therefore multiple cuts can be performed accidentally so that an increased wear and power output can not be excluded. As a result of their configuration, the disk mowing devices can be combined easily with processing tools in the form of crushing rollers or beater rotors for accelerating drying.

Moreover, drum-shaped and disk-shaped mowing devices are known that are used for cultivated specialty plants or as mowing attachments on crop choppers.

In the field of gardening, for cutting plants at locations that are difficult to access mowing devices are used that are comprised of a rotating plastic thread that also operates according to the free cut principle. In forestry, and in landscape cultivation, free cutters with working elements that are similar to a saw blade are used in order to cut shrubs and plants that have a strong stalk.

The patent literature discloses furthermore solutions where blade plants are cut with a circulating cutting tool in the form of a chain provided with cutting teeth (for example, U.S. Pat. No. 4,070,810; WO 96/32832). In place of the chain, a circulating endless V-belt is used as a support element in another document (DE 2707030).

Another known solution, in particular for mowing a lawn with a minimal working width, is realized by using cutting belts. For ensuring the cutting process, they are either maintained in a sharp state like a scythe (DE 4231665) or they are provided with cutting teeth (for example, U.S. Pat. No. 3,425,196; DE 3427900). These belts are either manufactured exclusively of steel or employ a different belt-shaped support material, for example, a fabric, plastic materials, or composite materials. For improving the cutting process, often finger-shaped counter holders are proposed that are designed to counteract yielding of the plants to be cut.

For an improved adaptation to the ground in the belt mowing machines, either guide rails with hinges (DE 2929184) or mowing systems that are assembled of individual mowing machines (U.S. Pat. No. 3,656,285) are proposed.

It is an object of the invention to provide a device with which the cutting process for a great working width can be realized with a high energy efficiency and which device requires only minimal manufacturing costs. Damage and wear occurring on the cutting belts are to be minimized. At the same time, it is to be ensured that, with only minimal retooling measures, the mowing machine, depending on the application, can operate according to the principle of a free cut as well as in interaction with counter holders and that, as needed, a processing effect can be obtained by providing corresponding auxiliary devices.

SUMMARY OF THE INVENTION

This object is solved according to the invention by a device for mowing plants by means of a circulating endless cutting belt with teeth, comprising for guiding the cutting belt a frame, deflection rollers as well as a lower guide rail, wherein the area of the cutting belt that is in engagement cooperates with guide brackets for fixation on the lower guide rail. Expedient embodiments of the invention are contained in the dependent claims.

A special advantage of the invention resides in that by means of a circulating endless cutting belt an inexpensive mowing machine with high efficiency per unit area and high cutting quality can be realized, wherein for guiding the cutting belt a frame, deflection rollers as well as a lower guide rail are provided and the area of the cutting belt that is in engagement interacts with guide brackets for fixation at the lower guide rail.

As a cutting tool a circulating endless toothed belt is used that preferably is made of thinly rolled high strength steel. This cutting principle is distinguished primarily in that the cutting belt can be mass produced at minimal cost. On the other hand, in addition to its function as a working tool, the cutting belt takes on at the same time the function of a machine element for transmitting the mechanical energy. In this way, the basic prerequisites for a universally applicable inexpensive mowing machine with high efficiency per unit area, minimal specific power demand, high cutting quality, and minimal injury potential is provided.

In order to be able to use the cutting belt for the intended purpose, it is moved across at least two deflection rollers having a sufficient diameter and horizontal axes oriented in the traveling direction during the mowing process. In this connection, the axis spacing of the rollers corresponds approximately to the useful working width. In order to be able to transmit the drive energy for the mowing action onto the cutting belt in an effective way, preferably at least one of the deflection rollers is driven. In this arrangement, the lower run of the belt that is guided at the desired cutting level effects mowing of the plants. As needed, and for prevailing conditions, the upper run of the cutting belt that runs in the opposite direction can be used for providing an additional cutting plane for additionally shortening long material to be mowed.

By selecting the speed of the circulating belt, a free cut without counter blade is possible in addition to performing a cut with counter holders. The required adaptation of the cutting speed can be provided by using the alternatingly available rotary speed of the power take-off shaft of 540 and 1000 rpm provided at many tractors or by changing the transmission ratio in the case of V-belt drives or by means of a transmission. In order to achieve for minimal cutting speeds the required additional support of the stems, guide rails are used that can be mounted with minimal expenditure and are provided with the required large number of counter holders.

For a safe guiding action of the cutting belt and for protecting it, outside of the area of the deflection rollers guide elements, preferably in the form of guide rails with guide brackets, are used at the lower and optionally the upper run. For supporting the forces that occur in the area of the deflection opposite to the traveling direction, the deflection rollers are provided with additional stop collars.

In order to prevent that during the cutting process the cutting belt will lift off and that soil and plant particles can deposit in the area between the guide rail and the cutting belt, the frame of the mowing machine is slanted forwardly. With this slanted arrangement, an additional pressing force from above acts on the cutting belt, and a shielding effect of the cutting belt relative to deposits is also provided.

Similar to the configuration of industrially produced belt saws, the cutting belt is comprised of a wear-resistant high-elasticity steel. For achieving a maximum service life, the cutting belt is provided with teeth that are effective on both sides and are designed such that by reversing the cutting belt two useable wear edges are provided on the teeth, respectively.

In order to be able to provide required cutting level adjustment of the belt mowing machine, the lower guide rail is comprised of two parts that are movable relative to one another. The top part is fixedly connected to the frame for supporting the cutting belt and the lower part that is designed at the same time as a guiding plate for ground contact can be pivoted such that different cutting levels are obtained.

For preventing overload as a result of large obstacles in the cutting plane, the mowing device is supported so as to be pivotable to the rear about a horizontal axis and is suspended on the base vehicle such that the pivoting action is coupled with an additional simultaneous lifting action of the mowing machine.

For obtaining an optionally desired processing effect in the mowed material, a rotor with horizontal axis of rotation is arranged in the area between the deflection rollers; its effect is determined by the rotary speed as well as the shape and position of additional baffles on the lower guide rail.

BRIEF DESCRIPTION OF THE DRAWINGS

The invention will be explained in the following in more detail with the aid of one embodiment. The corresponding figures show in.

DESCRIPTION OF PREFERRED EMBODIMENTS

Figure 1:
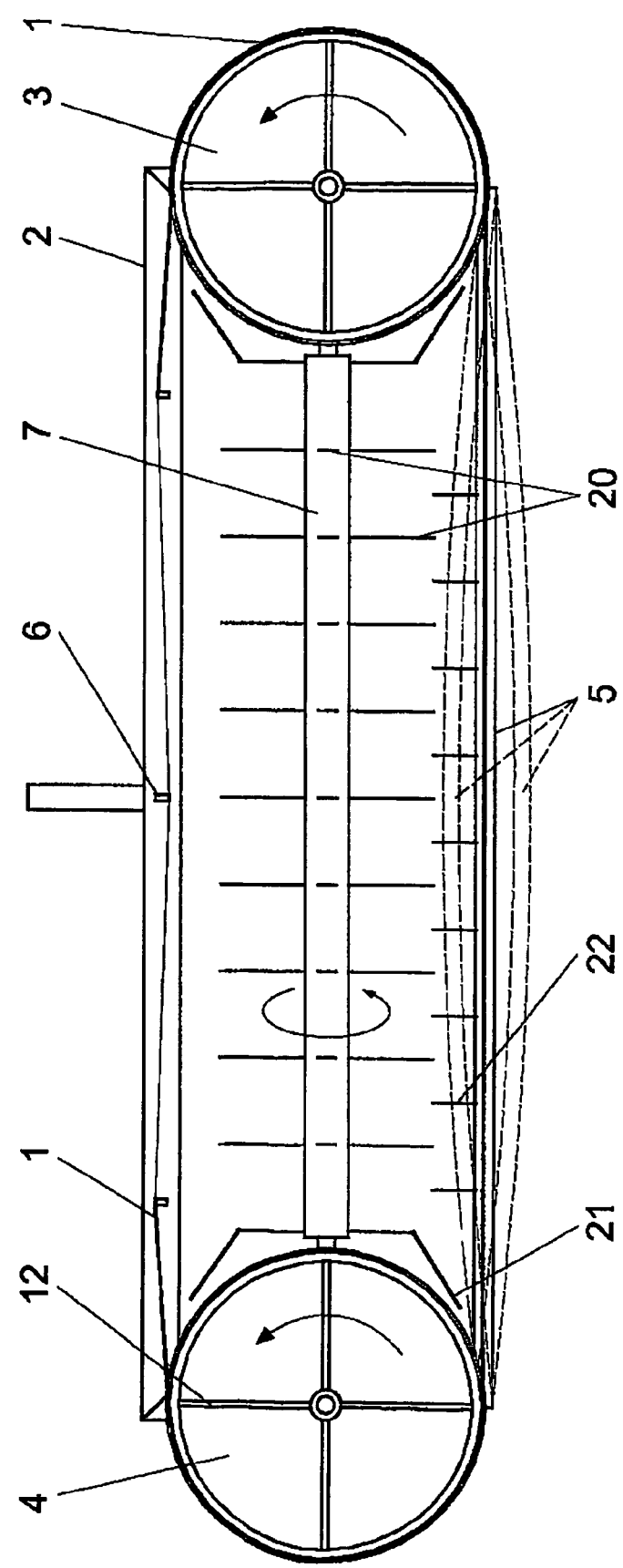
FIG. 1: a belt mowing machine illustration opposite to the travel direction.

According to FIG. 1, the belt mowing machine is comprised essentially of an endless circulating cutting belt 1 of high strength elastic steel. According to the invention, guiding of the cutting belt 1 is realized by a frame 2, the deflection rollers 3 and 4, the lower guide rail 5, and the upper guide in the form of a stripping and guiding element 6.

Figure 2:
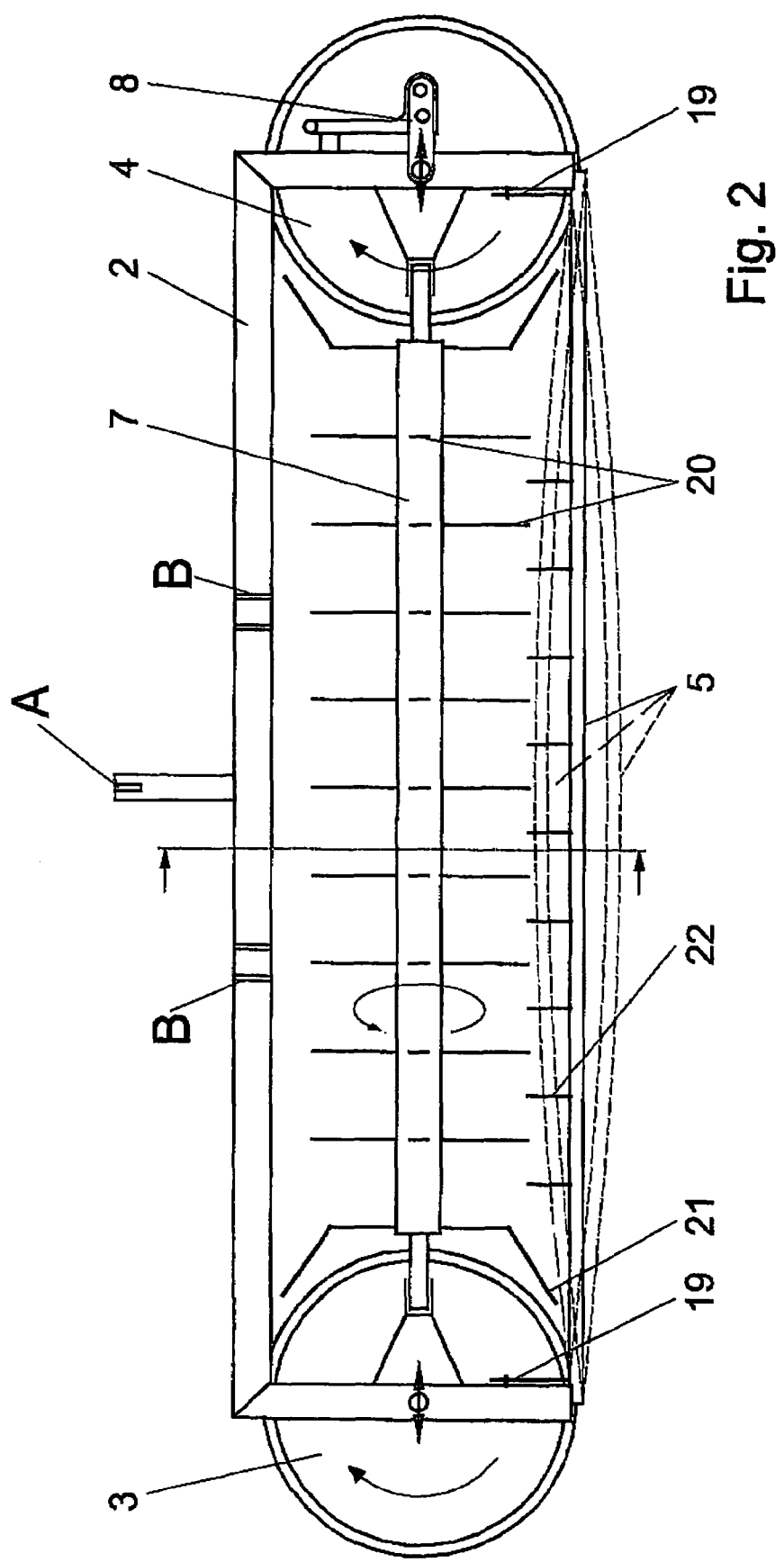
FIG. 2: a belt mowing machine illustration in the traveling direction.
Figure 3:
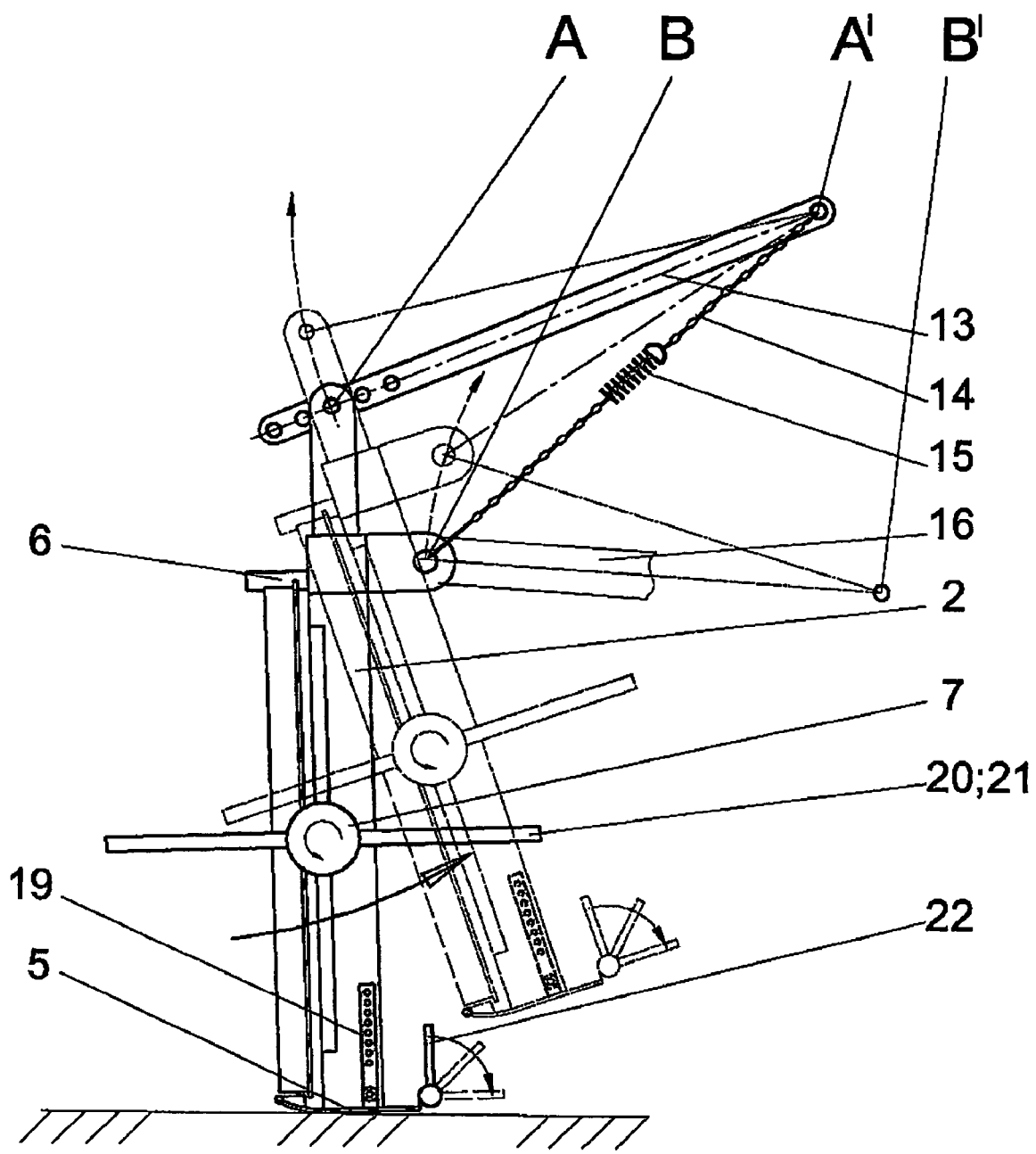
FIG. 3 a belt mowing machine in a side view.

The frame 2 provides in accordance with FIGS. 1, 2, 3 the connection to the base machine (tractor, self-propelled vehicle, device carrier etc.). It supports the bearing locations for the deflection rollers 3, 4 and the processing rotor 7 and serves for attachment of the lower guide rail 5 as well as the upper guide in the form of the upper stripping and guiding element 6 of the cutting belt 1. The coupling locations on the frame 2 are designed such that a direct coupling of the belt mowing machine to the lower guide bars of standardized front attachment devices, primarily on tractors, is possible. Operation of the mowing machine when connected to the rear is also possible by means of an appropriately designed extension arm.

For mounting or removing the cutting belt 1 as well as for ensuring a precise running of the belt, the axes of the deflection rollers 3, 4 are adjustable with regard to their spacing to one another and their slant for the purpose of correcting the running direction. For a time-saving change of the cutting belt 1 a quick clamping device 8 according to FIG. 2 is provided which, after tensioning the belt, produces again the axis correlation that is required for precise running.

Figure 4:
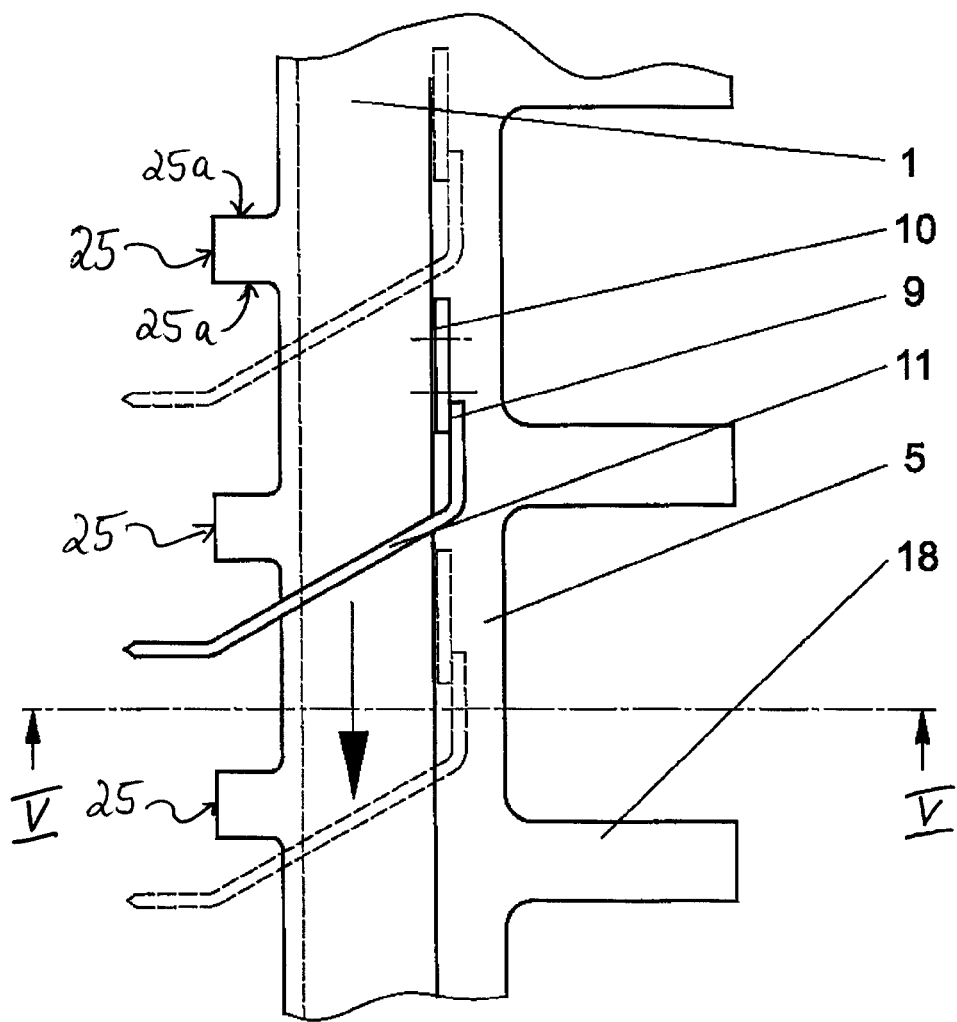
FIG. 4 a guide rail in a plan view.
Figure 5:
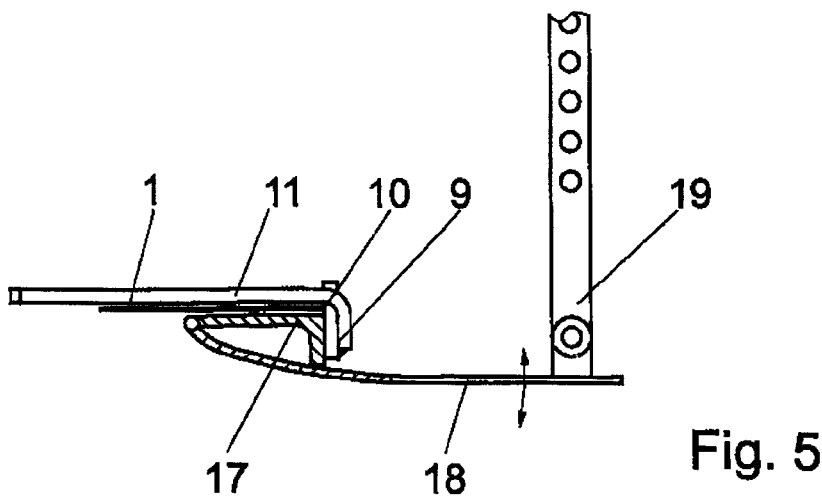
FIG. 5 a guide rail in cross-section.

The lower run of the cutting belt 1 runs on a guide rail 5 and is prevented by means of guide brackets 9 shown in FIGS. 4 and 5 from being deflected in a rearward direction or an upward direction. The guide brackets 9 have a fixed stop edge 10 for supporting the cutting force components resulting from the traveling movement. In order to prevent that cutting belt 1 lifts off the guide rail 5 and that plant material that has reached the area between the guide rail 5 and the cutting belt 1 will cause jamming, a holding-down element 11 of spring steel that can elastically deflect in the upward direction is provided. For obtaining an additional cleaning effect on the cutting belt surface, the holding-down element 11 is preferably positioned at an angle of 30 to 45 degrees. When the material is mowed according to the principle of a free cut, only a few guide brackets 9 are required on the guide rail 5. When the cutting process is to be carried out at a reduced cutting speed, an appropriate larger number of guide brackets 9 are to be arranged at minimal spacing relative to one another on the guide rail as counter holders (FIG. 4). When the holding-down elements 11 are designed in such a way that they project past the leading cutting edge of the cutting belt 1, an additional protective effect for the cutting belt 1 relative to obstacles that are present on the ground can be achieved in this case.

For an improved adaptation of the guide rail 5 to the respective contour of the ground, the guide rail is preferably embodied to be flexible in the vertical direction (FIG. 2). In this way, it will bend at the center in a downward direction as a result of its own weight when it is lifted. On the other hand, when it hits at the center a projection of the ground, a limited bending in the upward direction takes place.

In regard to the configuration of the cutting belt 1, a wide optimizing potential for obtaining optimal cutting properties and service life is provided. For example, the material properties, belt thickness, belt width, and tooth shapes can be matched to the characteristic conditions of use. According to the invention, the cutting teeth 25 are designed such that the cutting belt 1 can be used in both movement directions. This is achievable by an appropriate shaping of the cutting teeth 25 as well as by reversing the cutting belt 1.

In particular when mowing tall and fibrous plants, plant particles can wrap around the wear edges 25a of cutting teeth 25 of the belt and negatively affect the cutting action in this way. In order to provide a cleaning effect that is then required, the cutting belt 1 in the area of the upper run is passed between stripping and guiding elements 6. For obtaining the desired stripping effect, the elements are positioned at a slant to the movement direction of the cutting belt 1 and arranged such that only a one-sided belt contact is realized. The required contact force is generated by a minimal deflection of the cutting belt 1 as well as an operation-based belt tension.

In order to prevent that in the area of the deflection rollers 3, 4 the material to be cut or already cut leads to jamming in front of the deflection rollers, the deflection rollers are provided with additional radially arranged clearing elements 12 that laterally clear in accordance with their rotational movement the material to be cut.

On agricultural areas, it is to be expected that large obstacles will be encountered. Without an overload protection, a contact would lead to serious damage of the belt mowing machine. According to the invention, the belt mowing machine can be effectively protected by means of a special overload protection device. For this purpose, in accordance with FIG. 3, the upper connecting point A of the mowing machine is preferably connected by means of a length-adjustable coupling member (perforated rail, turn buckle) 13 with the connecting point A' at the tractor. Preferably a link chain 14 and a tension spring 15 are hung between the connecting points A' and B; with the mowing machine lowered into the working position, they provide an adjustable reduction of the contact force of the guide rail on the ground. When an obstacle that is not recognized by the machine operator is in the area of the lower guide rail 5, the impact creates a moment about the lower connecting point B that an additional force effect in the coupling member 13. Because of this force effect, by means of the pulling action of the coupling member 13 the lower guide bars of the tractor 16 are lifted upwardly above the frame of the mowing machine 2 on a circular path about the point B'. As a result of the kinematic conditions, the lower guide rail 5 therefore yields in the direction to the rear and is lifted also upwardly—an additional safety effect—out of the danger zone. With this solution, an automatic control, as a function of the acting horizontal force, of the contact force of the guide rail 5 on the ground is achieved at the same time. In the case of an increase of the horizontal force on the guide rail 5, which horizontal force is caused by the travel movement and the contact force, a pulling force is generated in the coupling member that effects relief of the guide rail 5 and thus of the resulting horizontal force.

For a simple adjustment of the cutting height, the lower guide rail 5 is comprised of a cutting belt support 17 and a slide rail 18 according to FIG. 5. The cutting belt support 17 is connected to the frame 2 and thus has always the same position relative to the cutting belt 1. The slide rail 18 is connected pivotably to the cutting belt support 17 and is pivotably connected relative to the frame 2 by means of a support 19. This support 19 is length-adjustable, and thus the cutting height.

For obtaining an optionally desired processing effect, a conveying and processing rotor 7 provided with tines can be arranged between the deflection rollers 3, 4. In this connection, the rotor axis is positioned approximately above the lower guide rail 5 and the outer tips of the tines 20 project maximally to an area close to the guide rail 5 when bent upwardly. In the area of the inner part of the deflection rollers 3, 4, the tines 21 are angled such that their tips project into the inlet and outlet areas of the cutting belt 1 without contacting the deflection rollers 3, 4. By selecting the rotary speed of the rotor 7 as well as by an optional arrangement of additional baffles 22 that are adjustable with regard to their effect, it is possible to adjust the processing degree in accordance with the agro-technical requirements. The lower rotary speed of the rotor 7 is selected such that for avoiding jamming the required conveying effect is still ensured.

The invention is not limited to the embodiments illustrated here. Instead, it is possible, by combination and modification of the aforementioned means and features, to realize further embodiment variants without departing from the gist of the invention.

LIST OF REFERENCE NUMERALS

1 cutting belt
2 frame
3 deflection roller
4 deflection roller
5 lower guide rail
6 stripping and guiding element
7 processing rotor
8 quick clamping device
9 guide bracket
10 stop edge
11 holding-down element
12 clearing element
13 coupling member
14 link chain
15 tension spring
16 lower guide bar
17 cutting belt support
18 slide rail
19 support
20 tines
21 angled tines
22 baffle
A; A' upper connecting point
B; B' lower connecting point

What is claimed is:

1. A device for mowing plants, the device comprising:
a frame;
deflection rollers connected to the frame;
a circulating endless cutting belt provided with cutting teeth and guided about the deflection rollers so that the cutting belt has an upper run and a lower run;

a lower guide rail connected to the frame for guiding the lower run of the cutting belt;

guide brackets connected to the lower guide rail for securing the lower run of the cutting belt on the lower guide rail;

wherein the guide brackets are configured to force by a spring load the lower run of the cutting belt against the lower guide rail and form a fixed stop relative to forces in the direction of the travel movement.

2. The device according to claim 1, wherein the guide brackets have holding-down elements and the holding-down elements provide the spring load forcing the lower run of the cutting belt against the lower guide rail and preventing the lower run of the cutting belt from lifting off the lower guide rail, wherein the guide brackets each have a stop edge providing the fixed stop.

3. The device according to claim 2, wherein the holding-down elements are arranged to project past a leading cutting edge of the cutting belt for operating modes other than a free cut operation.

4. The device according to claim 1, wherein the deflection rollers have a stop collar.

5. The device according to claim 1, wherein the cutting belt realizes a cutting process in at least one of a lower cutting plane and an upper cutting plane.

6. The device according to claim 1, wherein the lower guide rail is flexible in a vertical direction.

7. The device according to claim 1, wherein the frame is slanted forwardly during mowing.

8. The device according to claim 1, wherein the cutting teeth are effective in both movement directions of the cutting belt and are configured such that, by reversing the cutting belt, two useable wear edges are available on the cutting teeth, respectively.

9. The device according to claim 1, further comprising a conveying and processing rotor arranged within the frame between the deflection rollers.

10. The device according to claim 9, wherein the conveying and processing rotor has tines.

11. The device according to claim 1, further comprising baffles arranged on the lower guide rail.

12. The device according to claim 11, wherein the baffles are adjustable with regard to an angle of position.

13. The device according to claim 12, wherein the cutting teeth have two usable cutting edges.

14. The device according to claim 1, further comprising:

a coupling member mounted on the frame above a first connecting point provided on the frame for attachment of lower guide bars of a three-point attachment for tractors;

wherein the coupling member is adapted to be connected to a second connecting point provided on the tractor which second connecting point is located above a third connecting point provided on the tractor.

15. The device according to claim 14, further comprising a tensioning means adapted to be connected to the second connecting point and the first connecting point, wherein the tensioning means is a link chain comprising a tension spring.

16. The device according to claim 15, wherein the second connecting point is present at a standardized three-point attachment and wherein the second connecting point is used as a stop for the tensioning means.

* * * * *